US012578531B2

(12) United States Patent
Simmons et al.

(10) Patent No.: US 12,578,531 B2
(45) Date of Patent: Mar. 17, 2026

(54) SURFACE ROUGHNESS REDUCTION FOR PHOTONICS USING HIGH-TEMPERATURE IMPLANTATION

(71) Applicant: Applied Materials, Inc., Santa Clara, CA (US)

(72) Inventors: Eric Jay Simmons, Ballston Spa, NY (US); Qintao Zhang, Mt Kisco, NY (US); Wei Zou, Lexington, MA (US); Andrew Michael Waite, Beverly, MA (US); Jared Forrest Traynor, San Jose, CA (US); Miguel Sam Fung, Cupertino, CA (US); Vincent V. Granuzzo, Albany, NY (US); David J. Lee, Poughkeepsie, NY (US)

(73) Assignee: Applied Materials, Inc., Santa Clara, CA (US)

( * ) Notice: Subject to any disclaimer, the term of this patent is extended or adjusted under 35 U.S.C. 154(b) by 475 days.

(21) Appl. No.: 18/102,927

(22) Filed: Jan. 30, 2023

(65) Prior Publication Data

US 2024/0255700 A1 Aug. 1, 2024

(51) Int. Cl.
G02B 6/13 (2006.01)
*G02B 6/12* (2006.01)
*G02B 6/136* (2006.01)

(52) U.S. Cl.
CPC ...... G02B 6/13 (2013.01); *G02B 2006/12188* (2013.01); *G02B 6/136* (2013.01)

(58) Field of Classification Search
CPC .......... G02B 6/13; G02B 6/132; G02B 6/136; G02B 2006/12188
See application file for complete search history.

(56) References Cited

U.S. PATENT DOCUMENTS

2017/0242503 A1* 8/2017 Adibi ..................... C03C 17/42

FOREIGN PATENT DOCUMENTS

JP 2008-209450 A * 9/2008

OTHER PUBLICATIONS

K. Oyoshi et al. Smoothing of silica glass surfaces by ion implantation. Japanese Journal of Applied Physics, vol. 30 No. 8, pp. 1854-1859, Aug. 1991 (https://doi.org/10.1143/JJAP.30.1854) (Year: 1991).*
N. Toyoda et al. Surface smoothing of polycrystalline Si waveguides with gas-cluster ion beams. MRS Online Proceedings Library, vol. 597, pp. 51-55, May 2000 (https://doi.org/10.1557/PROC-597-51) (Year: 2000).*

(Continued)

*Primary Examiner* — Michael Stahl
(74) *Attorney, Agent, or Firm* — KDW Firm PLLC

(57) ABSTRACT

Disclosed herein are approaches for forming a uniform film with reduced surface roughness for photonic applications. One method includes providing a workpiece including a contact etch stop layer (CESL) over a device layer, patterning the CESL to expose an upper surface of the device layer in a waveguide target area, and patterning a waveguide from a dielectric film formed over the waveguide target area. The method may further include directing ions into an upper surface of the waveguide using a high-temperature ion implant to decrease a surface roughness of the upper surface of the waveguide.

13 Claims, 7 Drawing Sheets

(56) References Cited

OTHER PUBLICATIONS

R. Degl'Innocenti et al. Micromachining of ridge optical wave-guides on top of He+ implanted β-BaB2O4 crystals by femtosecond laser ablation. Journal of Applied Physics, vol. 100, pp. 113121-1-5, Dec. 2006 (https://doi.org/10.1063/1.2396716) (Year: 2006).*

Qing Fang et al., "Low Loss ( approximately 6.45dB/cm) Sub-Micron Polycrystalline Silicon Waveguide Integrated with Efficient SiON Waveguide Coupler", Apr. 28, 2008 / vol. 16, No. 9 / Optics Express, (pp. 6425-6432), total pp. 10.

F.Grillot et al., "Size Influence on the Propagation Loss Induced by Sidewall Roughness in Ultrasmall SOI Waveguides" IEEE Photonics Technology Letters, vol. 16, No. 7, Jul. 2004, pp. 1661-1663.

E.A. Douglas et al., "Effect of precursors on propagation loss for plasma-enhanced chemical vapor deposition of SiNx: H wave-guides", Optical Materials Express, vol. 6, No. 9 | Sep. 1, 2016 | Optical Materials Express, http://dx.doi.org/10.1364/OME.6.002892, pp. 2892-2903.

Yusheng Bian et al., "Monolithically integrated silicon nitride platform", Th1A.46, OFC 2021 © OSA 2021, 3 pages.

* cited by examiner

SURFACE ROUGHNESS REDUCTION FOR PHOTONICS USING HIGH-TEMPERATURE IMPLANTATION

FIELD OF THE DISCLOSURE

Embodiments of the present disclosure relate to a method of creating a uniform dielectric film, and more particularly a uniform film with reduced surface roughness for photonic applications.

BACKGROUND OF THE DISCLOSURE

Semiconductor workpieces are used for many applications. One such application is photonics which can be used for high-speed communication, high performance computing (HPC) or quantum computing. In one of such applications, a plurality of waveguides are created within a dielectric material on the top surface of the workpiece. Creating a workpiece with a uniform dielectric film using conventional techniques may be difficult. For example, spin coating and deposition often create a coating with an unacceptable surface roughness. This film surface roughness may result in a higher scattering loss and a higher photonic propagation loss.

Therefore, it would be beneficial if there were a method of processing dielectric films with improved surface roughness.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one aspect, a method may include providing a workpiece including a contact etch stop layer (CESL) over a device layer, patterning the CESL to expose an upper surface of the device layer in a waveguide target area, and patterning a waveguide from a dielectric film formed over the waveguide target area. The method may further include directing ions into an upper surface of the waveguide using a high-temperature ion implant to decrease a surface roughness of the upper surface of the waveguide.

In another aspect, a method of forming a waveguide may include providing a workpiece including a buried oxide atop a substrate, and a shallow trench isolation formed over the buried oxide, forming a contact etch stop layer (CESL) over the shallow trench isolation, and patterning the CESL to expose an upper surface of the shallow trench isolation in a waveguide target area. The method may further include forming an oxide layer over the CESL, including over the upper surface of the shallow trench isolation in the waveguide target area, patterning the waveguide from a dielectric film formed atop the oxide layer, wherein the waveguide is formed over the waveguide target area, and directing ions into an upper surface and a sidewall surface of the waveguide using a high-temperature ion implant to decrease a surface roughness of the upper surface of the waveguide.

In yet another aspect, a method of reducing surface roughness of a waveguide may include providing a workpiece including a buried oxide atop a substrate, and a shallow trench isolation formed over the buried oxide, forming a contact etch stop layer (CESL) over the shallow trench isolation, and patterning the CESL to expose an upper surface of the shallow trench isolation in a waveguide target area. The method may further include forming an oxide layer over the CESL, including over the upper surface of the shallow trench isolation in the waveguide target area, patterning the waveguide from a dielectric film formed atop the oxide layer, wherein the waveguide is formed over the waveguide target area, and directing ions into an upper surface and a sidewall surface of the waveguide using a high-temperature ion implant to decrease a surface roughness of the upper surface of the waveguide.

BRIEF DESCRIPTION OF THE DRAWINGS

The accompanying drawings illustrate exemplary approaches of the disclosure, including the practical application of the principles thereof, as follows.

Figure 1:
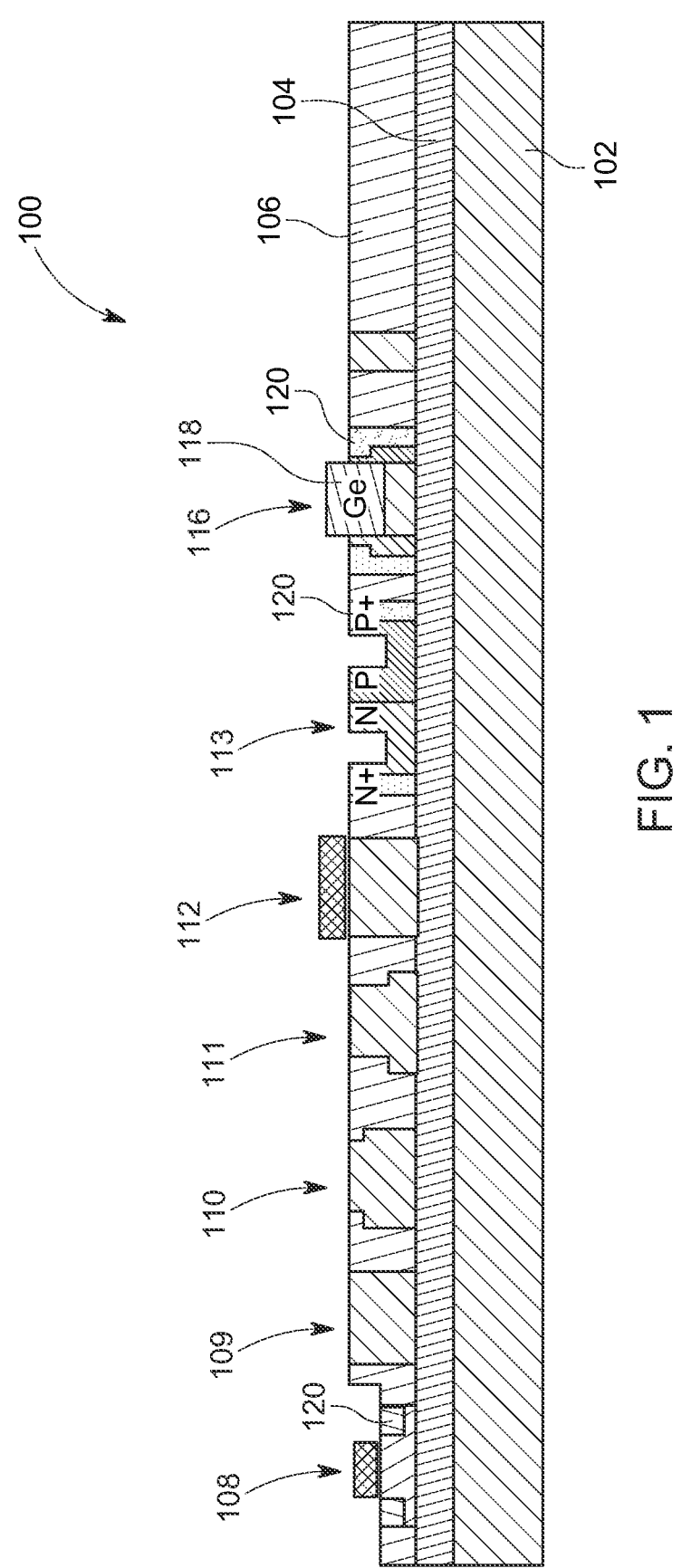
FIG. 1 illustrates a side cross-sectional view of a wafer, including a plurality of devices, following a source/drain silicidation process, according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Methods and devices in accordance with the present disclosure will now be described more fully hereinafter with reference to the accompanying drawings, where various embodiments are shown. The methods and devices may be embodied in many different forms and are not to be construed as being limited to the embodiments set forth herein. Instead, these embodiments are provided so the disclosure will be thorough and complete, and will fully convey the scope of the methods to those skilled in the art.

To address the deficiencies of the prior art described above, disclosed herein are techniques to achieve surface roughness reduction for photonic applications. In some embodiments, a single or multiple step tilted implant may be performed to improve both top surface and sidewall surface roughness. In some embodiments, the implant is a high-temperature implant used in SiN photonics. The techniques herein may also be used for Si-based photonics, mainly sidewall roughness, considering the top surface may be controlled by incoming SOI wafer quality.

FIG. 1 demonstrates a device 100 according to embodiments of the present disclosure. The device 100 may include a substrate 102, a buried insulator (e.g., buried oxide) 104 formed over the substrate 102, and a shallow trench isolation (STI) 106 and a silicon layer formed over the buried insulator 104. As demonstrated, a plurality of components and/or photonics may be formed from the silicon layer including, but not limited to, a CMOS device 108, a strip waveguide 109, a shallow rib waveguide 110, a deep rib waveguide 111, a metal-oxide-semiconductor (MOS) capacitor (MOSCAP) ring 112, a modulator 113 (e.g., Mach-Zehnder Interferometer), and a photodetector 116, which may include a Ge photodiode 118. Although not shown, the silicon layer may undergo the necessary steps (e.g., implantation, annealing, deposition, etching, etc.) to form the CMOS device 108 and the photonics. One non-limiting material for the STI 106 may include SiO2, which can be deposited using FCVD, HDP, High Aspect Ratio Process (HARP), etc.

The CMOS device 108 may include any now known or later developed integrated circuit structure(s) that would be integrated with photonics such as, but not limited to: transistors, trans-impedance amplifiers (TIA), drivers or passive devices (e.g., a resistor, capacitor or other passive element). The CMOS device 108 may be formed using any now known or later developed semiconductor fabrication techniques. In some embodiments, the device 100 may be formed using known CMOS FEOL, silicon photonics etch/implantation, and Ge photodiode epitaxy processes. At the completion of these processes, source/drain regions 120 of one or more of the components (e.g., the CMOS device 108, the modulator 113, and the photodetector 116) may be subjected to a silicidation process to form contacts therein.

Figure 2:
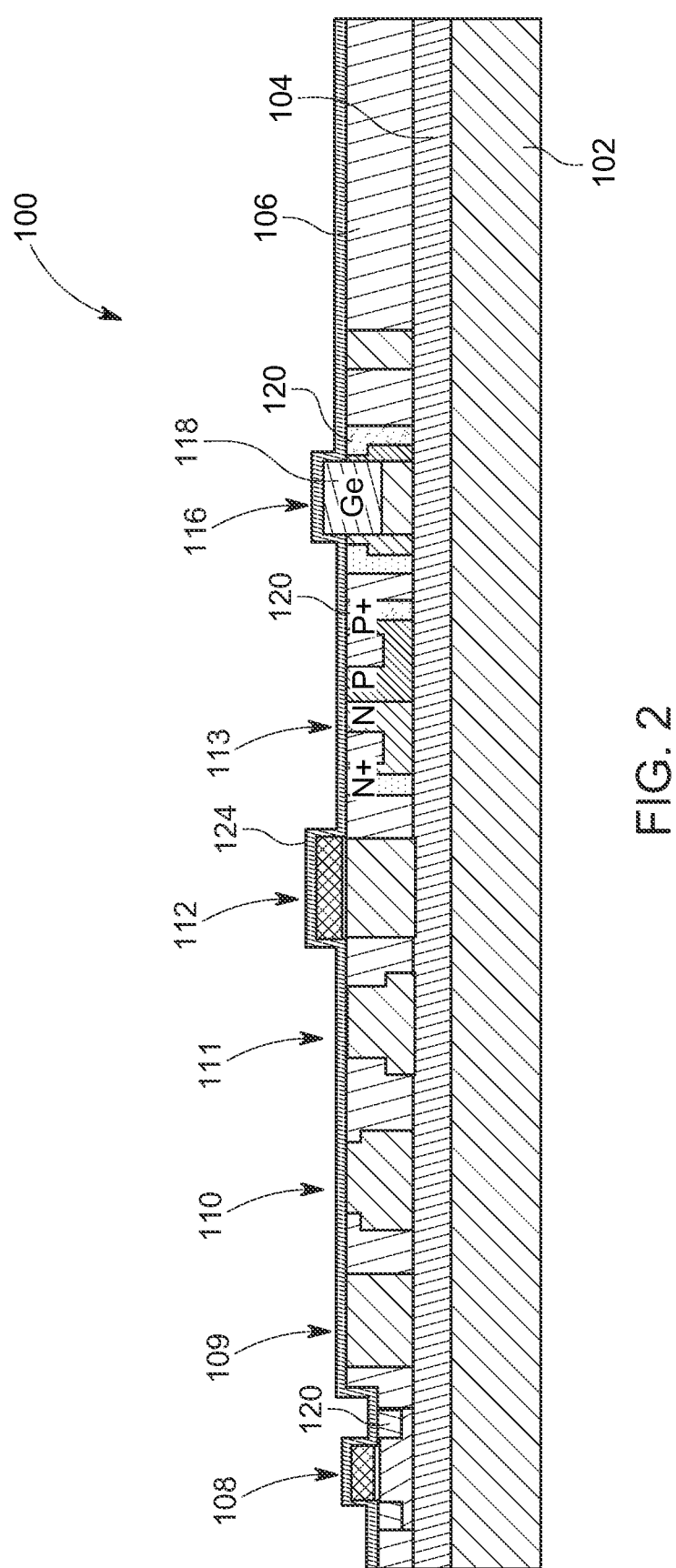
FIG. 2 illustrates a side cross-sectional side view of the device following formation of a contact etch stop layer, according to embodiments of the present disclosure.

FIG. 2 demonstrates formation of a contact etch stop layer (CESL) 124 over the device 100. As shown, the CESL 124 may be formed directly atop each of the components, as well as directly atop the STI 106. In some non-limiting embodiments, the CESL 124 may be SiN, which is formed via PECVD to a thickness of less than approximately 100 nm.

Figure 3:
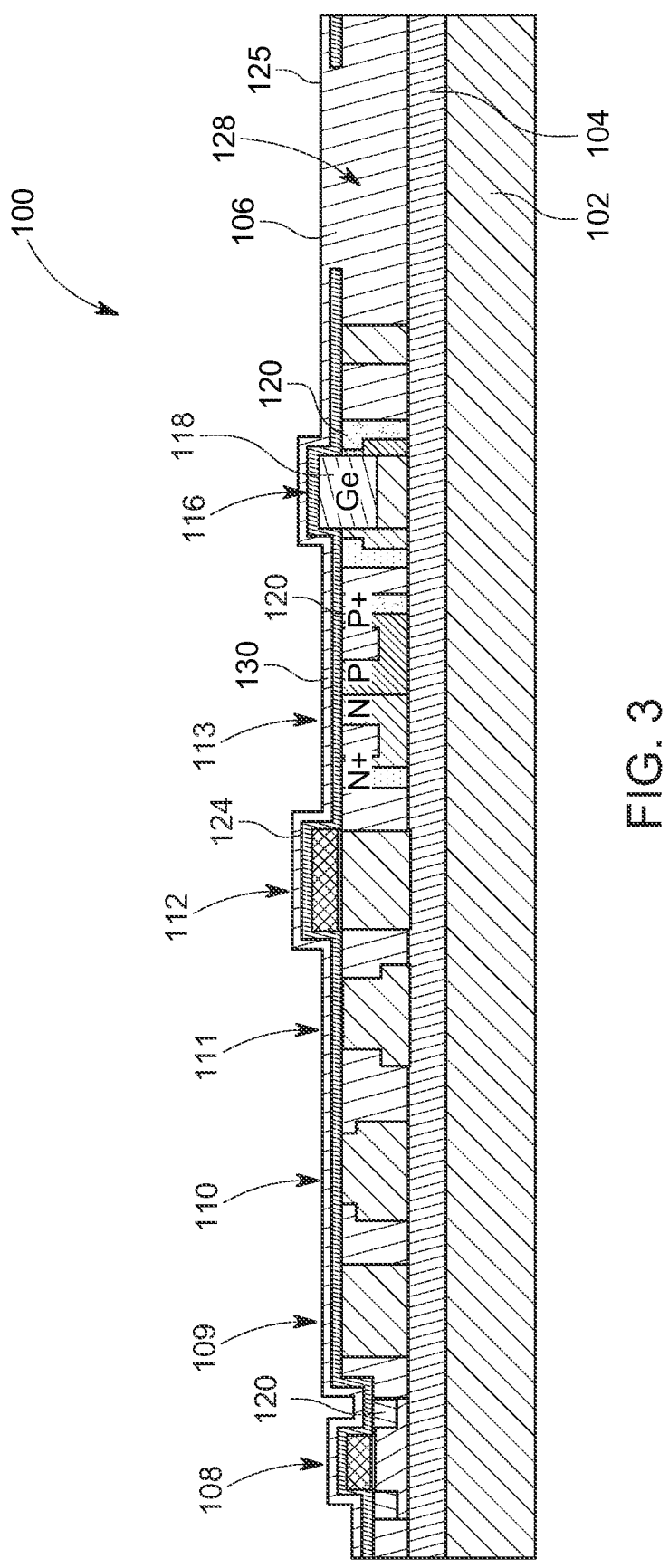
FIG. 3 illustrates a side cross-sectional side view of the device following formation of an oxide layer over the contact etch stop layer, according to embodiments of the present disclosure.

FIG. 3 demonstrates the CESL 124 after a patterning process (e.g., lithography and etch) to remove a portion of the CESL 124 and to expose an upper surface 125 of the STI 106 in a waveguide target area 128. An oxide layer 130 may then be formed over the device 100, including over the CESL 124 and over the upper surface 125 of the STI 106 in the waveguide target area 128.

Figure 4:
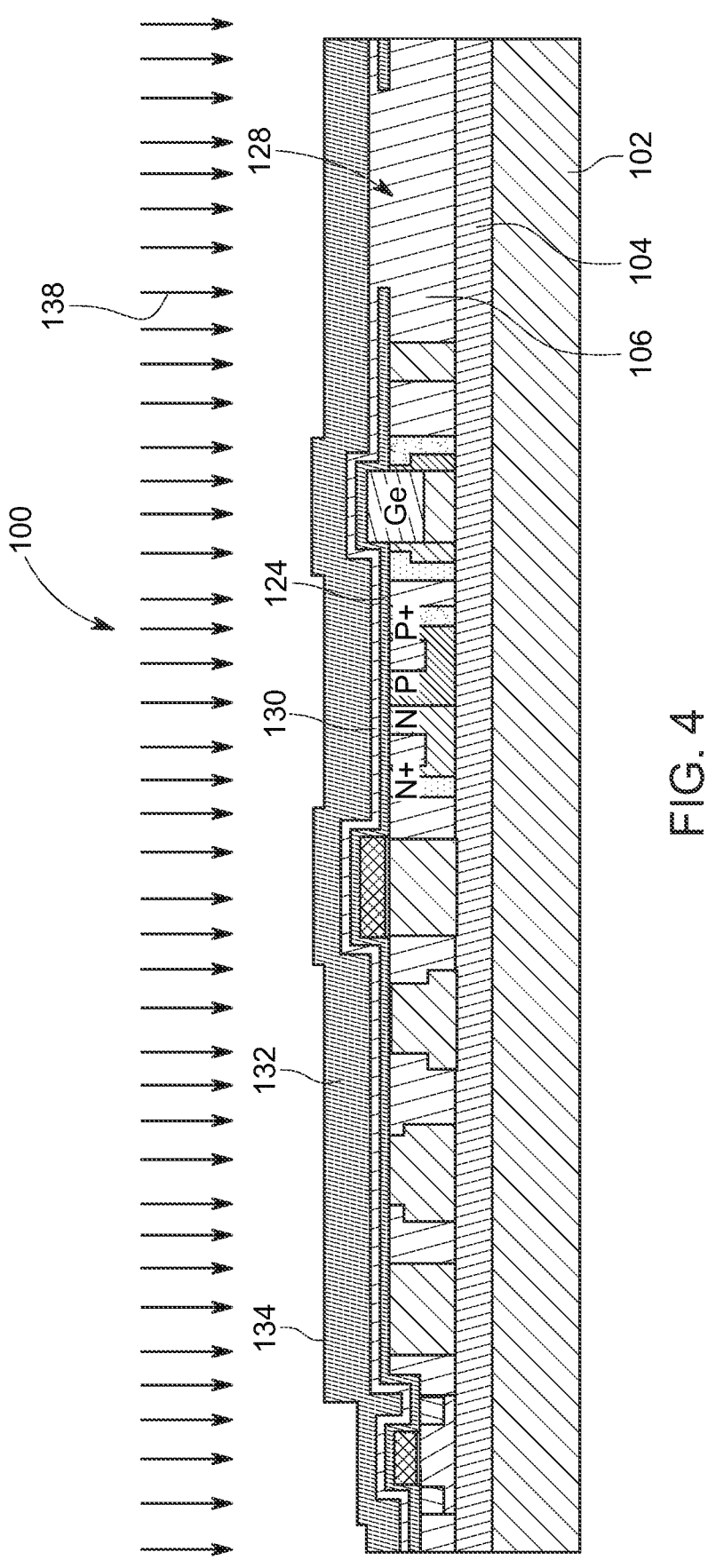
FIG. 4 illustrates a side cross-sectional side view of the device following formation of a dielectric film and optional ion implant, according to embodiments of the present disclosure.

FIG. 4 demonstrates formation of a dielectric film 132 over the device 100. More specifically, the dielectric film 132 may be deposited over the oxide layer 130, including over the waveguide target area 128. In some embodiments, the dielectric film 132 may be applied using physical vapor deposition (PVD), chemical vapor deposition (CVD), plasma enhanced CVD (PE-CVD) or spin coating to a thickness between 50 nm and 1 um. In the example shown, the dielectric film 132 comprises silicon nitride, although other dielectrics may be used. Note the dielectric film 132 includes an upper surface 134 having a surface roughness following formation. A higher surface roughness is associated with higher scattering loss.

To improve surface roughness, ions may be directed into the upper surface 134 of the dielectric film 132 using a high-temperature (e.g., between approximately 100° C.-550° C.) ion implant 138 to promote surface reflow and densification, which results in a decreased surface roughness. In some embodiments, the ions of the ion implant 138 include one or more of the following species: silicon, fluorine, neon, phosphorous, sulfur, argon, germanium, or arsenic. The ion implant 138 may be delivered at the energy which can penetrate the rough surface of the dielectric layer, such as 5 KeV to 60 KeV with dose range from $4E14/cm2$ to $5E16/cm^2$ and at a temperature no greater than 400° C., which is typically the maximum MEOL temperature. In some embodiments, the device 100 may be positioned atop a platform, which is heated to the desired temperature while the ion implant 138 is performed.

Figure 5:
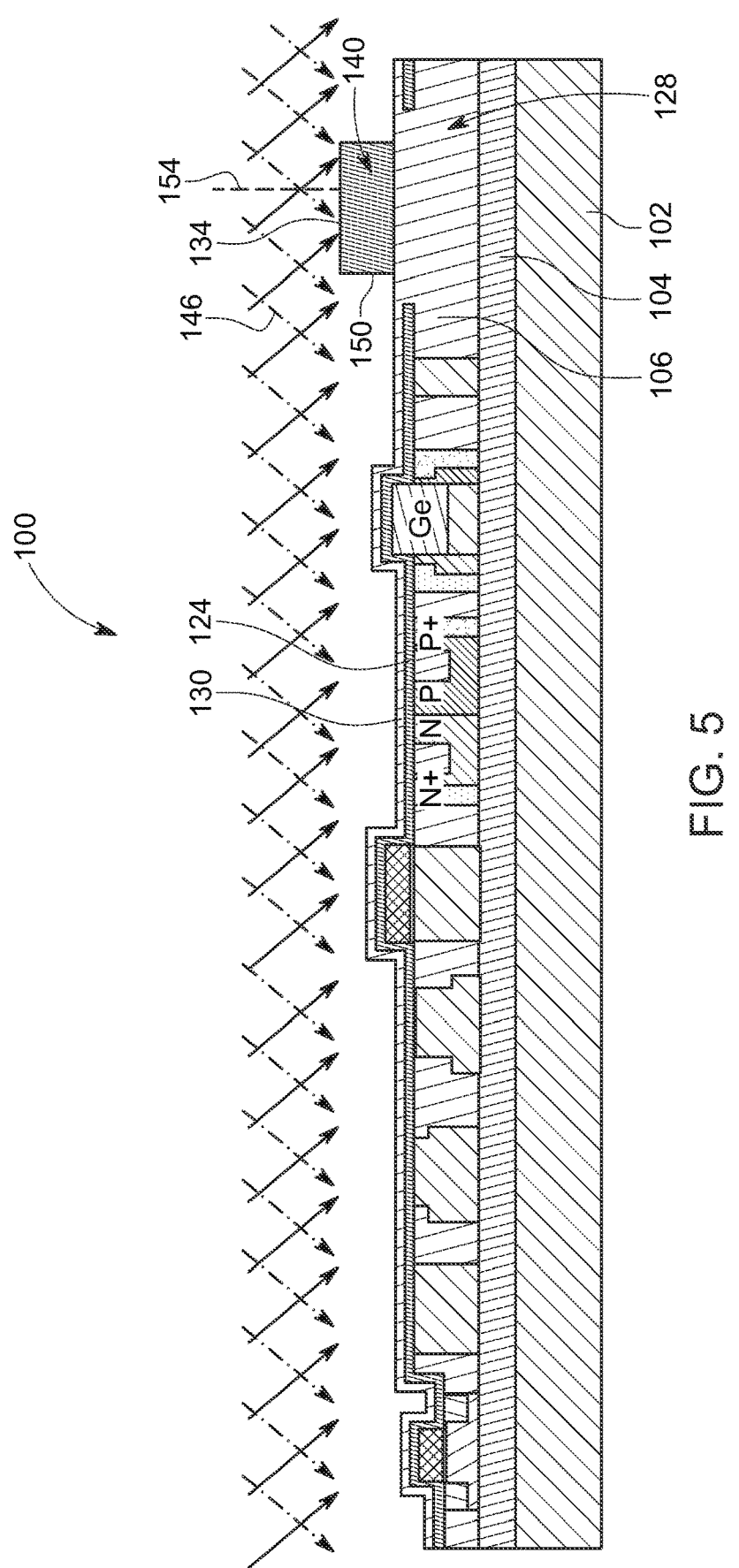
FIG. 5 illustrates a side cross-sectional side view of the device following formation of a waveguide and optional ion implant, according to embodiments of the present disclosure.

FIG. 5 demonstrates formation of a waveguide 140 by patterning (e.g., removing through etching with a mask) portions of the dielectric film 132. As shown, the waveguide 140 is formed over the waveguide target area 128. Due to the previously performed ion implant 138, the upper surface 134 of the waveguide 140 has a reduced roughness.

Figure 6:
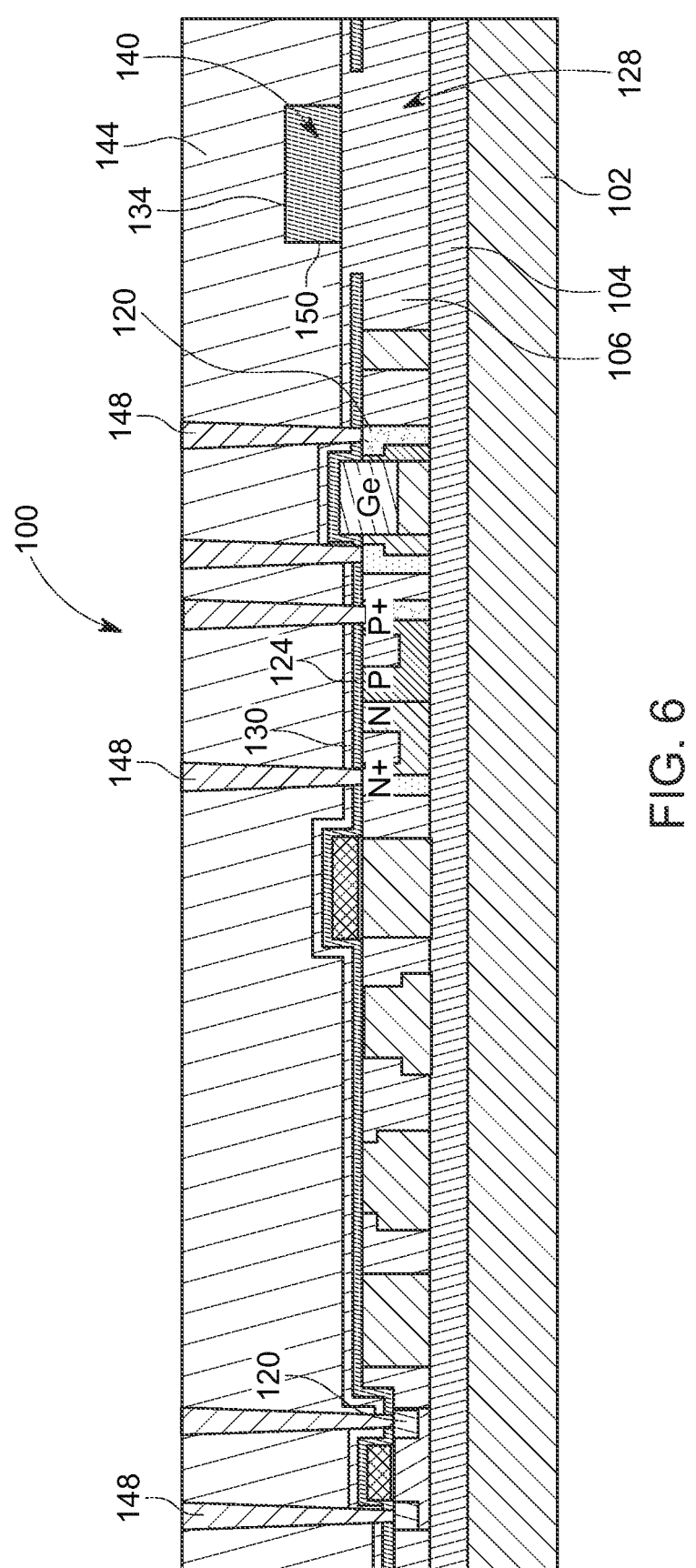
FIG. 6 illustrates a side cross-sectional side view of the device following a BEOL process, according to embodiments of the present disclosure.

The device 100 may then follow a conventional BEOL process, whereby an interlayer dielectric (ILD) 144 may be formed over the device 100, including directly over the waveguide 140 and the oxide layer 130, as demonstrated in FIG. 6. A plurality of openings may be formed through the ILD 144, and a metal (e.g., W) may be deposited into the plurality of openings to form a plurality of contact vias 148. As shown, the plurality of contact vias 148 may extend to the source/drain 120 of the photodetector 116, the modulator, 113, and the CMOS device 108.

Although non-limiting, suitable dielectric materials for the ILD 144 may include carbon-doped silicon oxide materials; fluorinated silicate glass (FSG); organic polymeric thermoset materials; silicon oxycarbide; SiCOH dielectrics; fluorine doped silicon oxide; spin-on glasses; silsesquioxanes, including hydrogen silsesquioxane (HSQ), methyl silsesquioxane (MSQ) and mixtures or copolymers of HSQ and MSQ; benzocyclobutene (BCB)-based polymer dielectrics, and any silicon-containing low-k dielectric. Examples of spin-on low-k films with SiCOH-type composition using silsesquioxane chemistry include HOSP™ (available from Honeywell), JSR 5109 and 5108 (available from Japan Synthetic Rubber), Zirkon™ (available from Shipley Microelectronics, a division of Rohm and Haas), and porous low-k (ELk) materials (available from Applied Materials). Examples of carbon-doped silicon dioxide materials, or organosilanes, include Black Diamond™ (available from Applied Materials) and Coral™ (available from Lam Research). In one non-limiting example, the STI 106 includes one or more variations of silicon oxide ($SiO_2$).

Referring again to FIG. 5, another approach for forming the waveguide 140 will be described. In this embodiment, ions may be directed into the upper surface 134 and sidewall surfaces 150 of the waveguide 140 using a high-temperature (e.g., between approximately 100° C.-550° C.) ion implant 146 after the waveguide 140 is patterned from the dielectric film 132. As shown, the ions may be delivered at a non-zero angle relative to a perpendicular 154 extending from the upper surface 134 of the waveguide 140 to enable the ions to reach the sidewall surfaces 150. The ion implant 146 advantageously promotes surface reflow and densification along both the upper surface 134 and the sidewall surfaces 150 of the waveguide 140. In this embodiment, the ion implant 138 demonstrated in FIG. 4 is not performed.

The ions of the ion implant 146 include one or more of the following species: silicon, fluorine, neon, phosphorous, sulfur, argon, germanium, or arsenic. Although non-limiting, the ion implant 146 may be delivered at an energy which can penetrate the rough surface of the dielectric layer, such as 5 KeV to 60 KeV, with dose range from 4E14/cm2 to 5E16/cm$^2$ and at a temperature no greater than 400° C., which is typically the maximum MEOL temperature. In some embodiments, the device 100 may be positioned atop a platform, which is heated to the desired temperature while the ion implant 146 is performed.

Following the ion implant 146, the ILD 144 may be formed over the device 100, including directly over both the upper surface 134 and the sidewall surfaces 150 of the waveguide 140, as demonstrated in FIG. 6.

Figure 7:
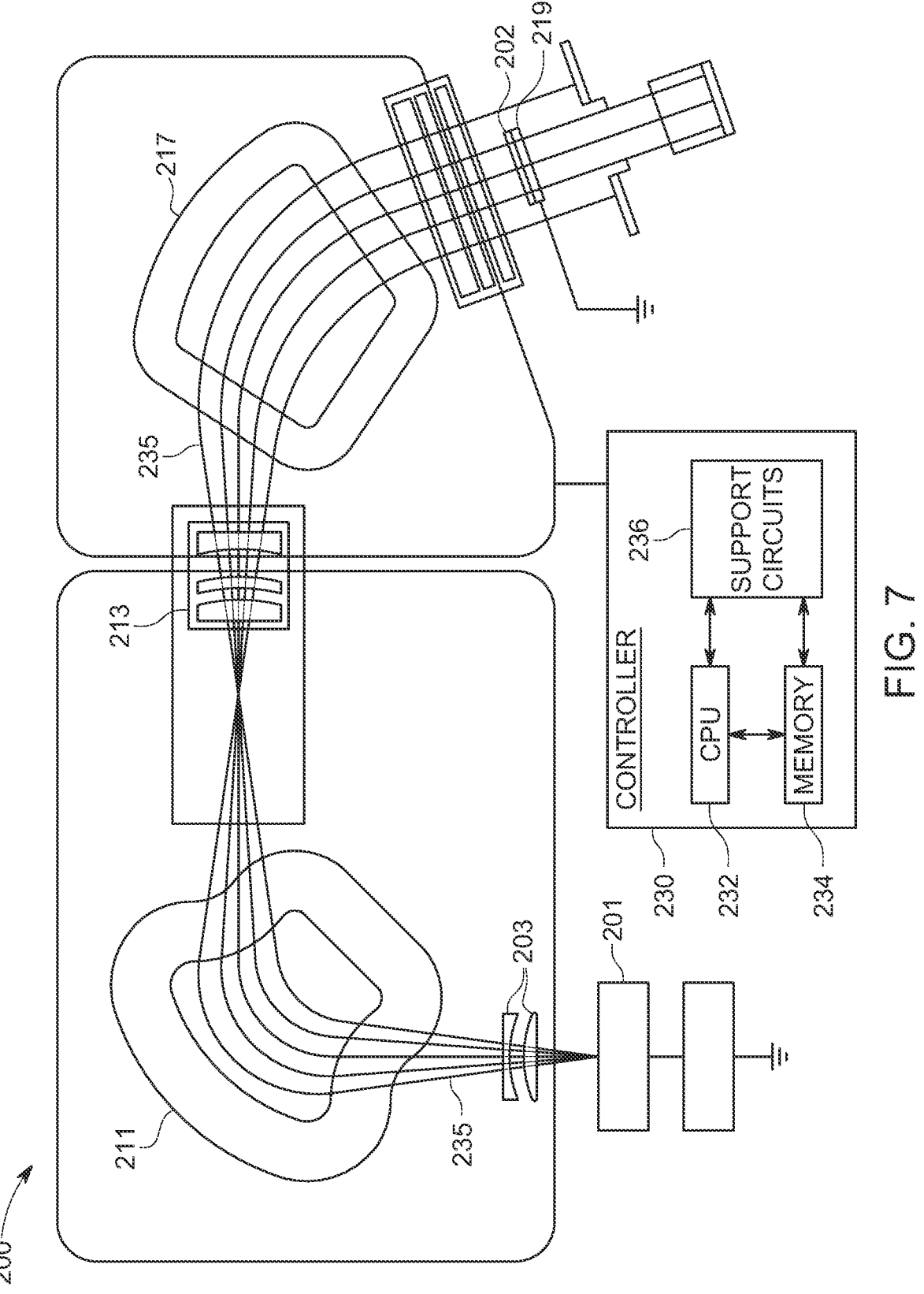
FIG. 7 illustrates a diagram of a processing apparatus according to embodiments of the present disclosure.

FIG. 7 illustrates a schematic diagram of a processing apparatus 200 useful to perform processes described herein. One example of a beam-line ion implantation processing apparatus is the Varian VIISTA® Trident, available from Applied Materials Inc., Santa Clara, CA. The processing apparatus 200 may include an ion source 201 for generating ions. For example, the ion source 201 may provide an ion implant, such as the ion implant 138 demonstrated in FIG. 4 and the ion implant 146 demonstrated in FIG. 5. The ion source 201 may also provide an ion etch, such as the etch used to form the plurality of openings for the plurality of contact vias 148.

The processing apparatus 200 may also include a series of beam-line components. Examples of beam-line components may include extraction electrodes 203, a magnetic mass analyzer 211, a plurality of lenses 213, and a beam parallelizer 217. The processing apparatus 200 may also include a platen 219 for supporting a substrate 202 to be processed. The substrate 202 may be the same as the substrate 102 described above. The substrate 202 may be moved in one or more dimensions (e.g., translate, rotate, tilt, etc.) by a platform component sometimes referred to as a "roplat" (not shown). It is also contemplated that the platen 219 may be configured to perform the heated implantation processes described herein to modify one or more waveguide surfaces.

In operation, ions of the desired species, for example, dopant ions, are generated and extracted from the ion source 201. Thereafter, the extracted ions 235 travel in a beam-like state along the beam-line components and may be implanted in the substrate 202. Similar to a series of optical lenses that manipulate a light beam, the beam-line components manipulate the extracted ions 235 along the ion beam. In such a manner, the extracted ions 235 are manipulated by the beam-line components while the extracted ions 235 are directed toward the substrate 202. It is contemplated that the apparatus 200 may provide for improved mass selection to implant desired ions while reducing the probability of undesirable ions (impurities) being implanted in the substrate 202.

In some embodiments, the processing apparatus 200 can be controlled by a processor-based system controller such as controller 230. For example, the controller 230 may be configured to control beam-line components and processing parameters associated with beam-line ion implantation processes. The controller 230 may include a programmable central processing unit (CPU) 232 that is operable with a memory 234 and a mass storage device, an input control unit, and a display unit (not shown), such as power supplies, clocks, cache, input/output (I/O) circuits, and the like, coupled to the various components of the processing apparatus 200 to facilitate control of the substrate processing. The controller 230 also includes hardware for monitoring substrate processing through sensors in the processing apparatus 200, including sensors monitoring the substrate position and sensors configured to receive feedback from and control a heating apparatus coupled to the processing apparatus 200. Other sensors that measure system parameters such as substrate temperature and the like, may also provide information to the controller 230.

To facilitate control of the processing apparatus 200 described above, the CPU 232 may be one of any form of general-purpose computer processor that can be used in an industrial setting, such as a programmable logic controller (PLC), for controlling various chambers and sub-processors. The memory 234 is coupled to the CPU 232 and the memory 234 is non-transitory and may be one or more of readily available memory such as random access memory (RAM), read only memory (ROM), floppy disk drive, hard disk, or any other form of digital storage, local or remote. Support circuits 236 may be coupled to the CPU 232 for supporting the processor in a conventional manner. Implantation and other processes are generally stored in the memory 234, typically as a software routine. The software routine may also be stored and/or executed by a second CPU (not shown) that is remotely located from the hardware being controlled by the CPU 232.

The memory 234 is in the form of computer-readable storage media that contains instructions, that when executed by the CPU 232, facilitates the operation of the apparatus 200. The instructions in the memory 234 are in the form of a program product such as a program that implements the method of the present disclosure. The program code may conform to any one of a number of different programming languages. In one example, the disclosure may be implemented as a program product stored on computer-readable storage media for use with a computer system. The program(s) of the program product define functions of the embodiments (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

It is to be understood that the various layers, structures, and regions shown in the accompanying drawings are schematic illustrations. For ease of explanation, one or more layers, structures, and regions of a type commonly used to form semiconductor devices or structures may not be explicitly shown in a given drawing. This does not imply that any layers, structures, and/or regions not explicitly shown are omitted from the actual semiconductor structures.

In various embodiments, design tools can be provided and configured to create the datasets used to pattern the semiconductor layers of the device 100, e.g., as described herein. For example, data sets can be created to generate photomasks used during lithography operations to pattern the layers for structures as described herein. Such design tools can include a collection of one or more modules and can also be comprised of hardware, software or a combination thereof. Thus, for example, a tool can be a collection of one or more software modules, hardware modules, software/hardware modules or any combination or permutation thereof. As another example, a tool can be a computing device or other appliance running software, or implemented in hardware.

As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading the Detailed Description, the various features and functionality described herein may be implemented in any given application and can be implemented in one or more separate or shared modules in various combinations and permutations. Although various features or elements of functionality may be individually described or claimed as separate modules, one of ordinary skill in the art will understand these features and functionality can be shared among one or more common software and hardware elements.

For the sake of convenience and clarity, terms such as "top," "bottom," "upper," "lower," "vertical," "horizontal," "lateral," and "longitudinal" will be understood as describing the relative placement and orientation of components and their constituent parts as appearing in the figures. The terminology will include the words specifically mentioned, derivatives thereof, and words of similar import.

As used herein, an element or operation recited in the singular and proceeded with the word "a" or "an" is to be understood as including plural elements or operations, until such exclusion is explicitly recited. Furthermore, references to "one embodiment" of the present disclosure are not intended as limiting. Additional embodiments may also incorporating the recited features.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

Still furthermore, one of ordinary skill will understand when an element such as a layer, region, or substrate is referred to as being formed on, deposited on, or disposed "on," "over" or "atop" another element, the element can be directly on the other element or intervening elements may also be present. In contrast, when an element is referred to as being "directly on," "directly over" or "directly atop" another element, no intervening elements are present.

As used herein, "depositing" and/or "deposited" may include any now known or later developed techniques appropriate for the material to be deposited including yet not limited to, for example: chemical vapor deposition (CVD), low-pressure CVD (LPCVD), and plasma-enhanced CVD (PECVD). Additional techniques may include semi-atmosphere CVD (SACVD) and high density plasma CVD (HDPCVD), rapid thermal CVD (RTCVD), ultra-high vacuum CVD (UHVCVD), limited reaction processing CVD (LRPCVD), metal-organic CVD (MOCVD), and sputtering deposition. Additional techniques may include ion beam deposition, electron beam deposition, laser assisted deposition, thermal oxidation, thermal nitridation, spin-on methods, physical vapor deposition (PVD), atomic layer deposition (ALD), chemical oxidation, molecular beam epitaxy (MBE), plating, evaporation.

While certain embodiments of the disclosure have been described herein, the disclosure is not limited thereto, as the disclosure is as broad in scope as the art will allow and the specification may be read likewise. Therefore, the above description is not to be construed as limiting. Instead, the above description is merely as exemplifications of particular embodiments. Those skilled in the art will envision other modifications within the scope and spirit of the claims appended hereto.

What is claimed is:

1. A method, comprising:
providing a workpiece including a contact etch stop layer (CESL) over a device layer;
patterning the CESL to expose an upper surface of the device layer in a waveguide target area;
patterning a waveguide from a dielectric film, wherein the waveguide is positioned over the waveguide target area; and
directing ions into an upper surface of the waveguide using a high-temperature ion implant to decrease a surface roughness of the upper surface of the waveguide.

2. The method of claim 1, further comprising:
forming an oxide layer over the CESL, including over the upper surface of the device layer in the waveguide target area; and
forming the dielectric film atop the oxide layer.

3. The method of claim 1, wherein the ions of the high-temperature ion implant are directed into the waveguide at a non-zero angle relative to a perpendicular extending from the upper surface of the waveguide, and wherein the ions of the high-temperature ion implant are further directed into a sidewall surface of the waveguide.

4. The method of claim 1, further comprising forming an interlayer dielectric over the waveguide.

5. The method of claim 4, further comprising:
providing a photodetector and a modulator formed in the device layer; and
forming a plurality of contacts through the interlayer dielectric, wherein the plurality of contacts extend to a source/drain of the photodetector and the modulator.

6. The method of claim 1, wherein the device layer is a shallow trench isolation, wherein the CESL and the dielectric film are silicon nitride, and wherein the ions of the ion implant include one of the following species: silicon, fluorine, neon, phosphorous, sulfur, argon, germanium, or arsenic.

7. A method of forming a waveguide, comprising:
providing a workpiece including a buried oxide atop a substrate, and a shallow trench isolation formed over the buried oxide;
forming a contact etch stop layer (CESL) over the shallow trench isolation;
patterning the CESL to expose an upper surface of the shallow trench isolation in a waveguide target area;
forming an oxide layer over the CESL, including over the upper surface of the shallow trench isolation in the waveguide target area;
directing ions into an upper surface of a dielectric film formed atop the oxide layer using a high-temperature ion implant to decrease a surface roughness of the upper surface of the dielectric film; and patterning a waveguide from the dielectric film after the high-temperature ion implant, wherein the waveguide is formed over the waveguide target area.

8. The method of claim 7, further comprising forming an interlayer dielectric over the waveguide.

9. The method of claim 8, further comprising:

providing a photodetector and a modulator formed in the shallow trench isolation; and forming a plurality of contacts through the interlayer dielectric, wherein the plurality of contacts extend to a source/drain of the photodetector and the modulator.

10. The method of claim 7, wherein the CESL and the dielectric film are each silicon nitride, and wherein the ions of the ion implant include one of the following species: silicon, fluorine, neon, phosphorous, sulfur, argon, germanium, or arsenic.

11. A method for reducing surface roughness of a waveguide, the method comprising:

providing a workpiece including a buried oxide atop a substrate, and a shallow trench isolation formed over the buried oxide;

forming a contact etch stop layer (CESL) over the shallow trench isolation;

patterning the CESL to expose an upper surface of the shallow trench isolation in a waveguide target area;

forming an oxide layer over the CESL, including over the upper surface of the shallow trench isolation in the waveguide target area;

patterning the waveguide from a dielectric film formed atop the oxide layer, wherein the waveguide is formed over the waveguide target area; and directing ions into an upper surface of the waveguide using a high-temperature ion implant to reduce the surface roughness of the upper surface of the waveguide.

12. The method of claim 11, wherein the ions of the high-temperature ion implant are directed into the waveguide at a non-zero angle relative to a perpendicular extending from the upper surface of the waveguide, and wherein the ions of the high-temperature ion implant are further directed into a sidewall surface of the waveguide.

13. The method of claim 11, further comprising forming an interlayer dielectric over the waveguide.

* * * * *